US008260951B2

(12) United States Patent
Chen et al.

(10) Patent No.: US 8,260,951 B2
(45) Date of Patent: *Sep. 4, 2012

(54) RATE-CONTROLLABLE PEER-TO-PEER DATA STREAM ROUTING

(75) Inventors: Minghua Chen, Redmond, WA (US); Miroslav Ponec, Bellevue, WA (US); Sudipta Sengupta, Redmond, WA (US); Jin Li, Sammamish, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/612,395

(22) Filed: Nov. 4, 2009

(65) Prior Publication Data
US 2010/0146108 A1  Jun. 10, 2010

Related U.S. Application Data

(63) Continuation of application No. 11/945,306, filed on Nov. 27, 2007, now Pat. No. 7,636,789.

(51) Int. Cl.
*G06F 15/16* (2006.01)
(52) U.S. Cl. ............... 709/231; 370/351; 725/105
(58) Field of Classification Search .......... 370/252, 370/352, 395.64; 725/36; 709/231, 238
See application file for complete search history.

(56) References Cited

U.S. PATENT DOCUMENTS

| | | | | |
|---|---|---|---|---|
| 4,679,191 A * | 7/1987 | Nelson et al. | ............... | 370/355 |
| 5,253,248 A * | 10/1993 | Dravida et al. | ............. | 370/228 |
| 5,892,535 A * | 4/1999 | Allen et al. | .................... | 725/36 |
| 6,005,861 A * | 12/1999 | Humpleman | ................. | 370/352 |
| 6,570,867 B1 * | 5/2003 | Robinson et al. | ............ | 370/351 |
| 6,647,028 B1 * | 11/2003 | Lancon et al. | ................ | 370/535 |
| 7,124,187 B1 * | 10/2006 | Kodialam et al. | ............ | 709/226 |
| 7,184,992 B1 | 2/2007 | Polyak et al. | | |
| 7,292,583 B2 * | 11/2007 | Schoenblum | ............ | 370/395.64 |
| 7,319,668 B2 * | 1/2008 | Kobayashi | .................... | 370/231 |
| 7,519,731 B1 * | 4/2009 | Enns | ............................. | 709/238 |
| 7,936,695 B2 * | 5/2011 | Oran | ............................. | 370/252 |
| 2003/0195984 A1 * | 10/2003 | Zisapel et al. | ............... | 709/238 |
| 2004/0230680 A1 | 11/2004 | Jain et al. | | |
| 2006/0007947 A1 | 1/2006 | Li et al. | | |
| 2006/0146716 A1 | 7/2006 | Lun et al. | | |
| 2006/0177061 A1 * | 8/2006 | Orsini et al. | .................. | 380/268 |
| 2006/0187860 A1 | 8/2006 | Li | | |

(Continued)

OTHER PUBLICATIONS

Lun, "Efficient Operation of Coded Packet Networks", Date: Jun. 2006, pp. 1-122.

(Continued)

*Primary Examiner* — Dustin Nguyen
(74) *Attorney, Agent, or Firm* — Microsoft Corporation

(57) ABSTRACT

Difficulties associated with choosing advantageous network routes between server and clients are mitigated by a routing system that is devised to use many routing path sets, where respective sets comprise a number of routing paths covering all of the clients, including through other clients. A server may then apportion a data stream among all of the routing path sets. The server may also detect the performance of the computer network while sending the data stream between clients, and may adjust the apportionment of the routing path sets including the route. The clients may also be configured to operate as servers of other data streams, such as in a video-conferencing session, for example, and may be configured to send detected route performance information along with the portions of the various data streams.

20 Claims, 10 Drawing Sheets

U.S. PATENT DOCUMENTS

| | | | |
|---|---|---|---|
| 2006/0215577 A1* | 9/2006 | Guichard et al. | 370/254 |
| 2006/0285489 A1* | 12/2006 | Francisco et al. | 370/229 |
| 2007/0011237 A1 | 1/2007 | Mockett | |
| 2007/0025364 A1 | 2/2007 | Kodialam et al. | |
| 2007/0087756 A1 | 4/2007 | Hoffberg | |
| 2007/0111757 A1 | 5/2007 | Cao et al. | |
| 2007/0201371 A1 | 8/2007 | Chou et al. | |
| 2008/0049629 A1* | 2/2008 | Morrill | 370/250 |
| 2008/0114892 A1* | 5/2008 | Bruno et al. | 709/234 |
| 2009/0327917 A1* | 12/2009 | Aaron et al. | 715/751 |
| 2009/0327918 A1* | 12/2009 | Aaron et al. | 715/751 |

OTHER PUBLICATIONS

Shi, "Design of Overlay Networks for Internet Multicast", Date: Aug. 20, 2002, pp. 1-148.

Wu, "Network Coding for Multicasting", Date: Jan. 2006, pp. 1-229.

Yi, et al., "Stochastic Network Utility Maximization a Tribute to Kelly's Paper Published in This Journal a Decade Ago", Date: 2007, pp. 1-21.

Notice of Allowance cited in related U.S. Appl. No. 11/945,306 dated Aug. 27, 2009.

* cited by examiner

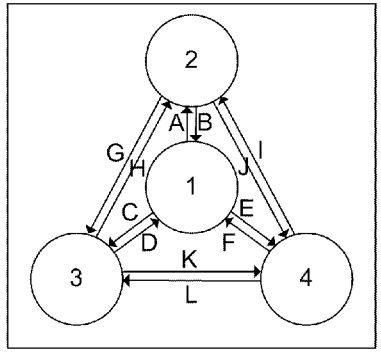

FIG. 10

| Routing Path Set Number | Routing Path Set | Routes Included |
|---|---|---|
| 1 | | A, C, E |
| 2 | | A, G, E |
| 3 | | C, H, E |
| 4 | | A, C, K |
| 5 | | A, E, L |
| 6 | | A, C, J |
| 7 | | C, E, I |

FIG. 11

| | Event | Routing Path Set Apportionment: | | | | | | |
|---|---|---|---|---|---|---|---|---|
| | | Set 1 | Set 2 | Set 3 | Set 4 | Set 5 | Set 6 | Set 7 |
| | Initialization | 14% | 14% | 14% | 14% | 14% | 14% | 14% |
| 142 | Computer 4: Route K Is Slow | 15% | 15% | 15% | 10% | 15% | 15% | 15% |
| 142 | Computer 3: Route L Is Fast | 14% | 14% | 14% | 9% | 21% | 14% | 14% |
| 142 | Computer 4: Route E Is Slow | 12% | 12% | 12% | 14% | 19% | 19% | 12% |
| 142 | Computer 3: Route C Is Fast | 14% | 7% | 14% | 16% | 14% | 21% | 14% |
| 142 | Computer 3: Route G Is Very Slow | 15% | 1% | 15% | 17% | 15% | 22% | 15% |
| 142 | Computer 1: Route A Is Very Fast | 18% | 5% | 12% | 20% | 18% | 25% | 12% |

FIG. 12

RATE-CONTROLLABLE PEER-TO-PEER DATA STREAM ROUTING

RELATED APPLICATIONS

This application is a continuation of U.S. patent application Ser. No. 11/945,306, filed on Nov. 27, 2007 now U.S. Pat. No. 7,636,789, entitled "RATE-CONTROLLABLE PEER-TO-PEER DATA STREAM ROUTING" which is hereby incorporated by reference in its entirety.

BACKGROUND

Computer systems may be configured to generate and share with other computer systems via a computer network a variety of data streams, such as audio/voice streams in a teleconferencing session, video streams during a videoconferencing session, and streams of computational data units in a network multiprocessing session. The network connecting the computer systems may present some characteristics pertinent to the sharing of the data streams, such as the upload bandwidth and download bandwidth of the computer systems. Various network topologies may be selected for sharing the data among the users, and the network topologies may have comparative performance advantages and disadvantages according to the network characteristics. For example, a network comprising one computer system with a high-bandwidth connection and many computer systems may benefit from utilizing the high-bandwidth computer system as a centralized server, which receives the data streams from all of the low-bandwidth computer systems and retransmits the combined data stream to all low-bandwidth computer systems. Some retransmission delay may be involved, but the performance of the low-bandwidth machines is improved by having to send only one data stream and receive only one data stream. By contrast, among a set of computer systems with sufficiently high-bandwidth connections, a multicasting scenario may be advantageous, whereby each computer system sends its data stream directly to all other computer systems. This network topology reduces the data stream latency by limiting retransmission delays.

Computer systems may also be configured to share data according to a peer-to-peer model. In this model, computer systems cooperate to distribute a data set to all requesting computer systems by receiving portions of the data set from a variety of computer systems that have portions of the data set, and by retransmitting the received portions to computer systems that do not have these portions of the data portions. The network topology of the peer-to-peer network may provide improved performance in the distribution of the data set to all requesting computer systems.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure presents a technique for sharing data streams among computer systems according to a peer-to-peer model. In the model presented herein, a computer system may operate as the server of a data stream on behalf of a client set (e.g., where the computer system is the source of a video stream in a videoconferencing session.) The server devises a plurality of routing path sets by which portions of the data stream may be delivered to each client in the client set. The server then apportions the data stream among all of the routing path sets, thereby sending the data to the clients along each available routing path in the routing path set. The server also monitors the performance of the computer network while sending the data stream along the routing paths of the routing path sets, and adjusts the apportionment of the data stream among the routing path sets based on the routing delays of the routes in the routing paths.

In a peer-to-peer model such as a teleconferencing session or a videoconferencing session, multiple computer systems may be configured as servers configured to deliver a data stream to the clients of the session, and each of which may also operate as a client while receiving the data streams produced by the other computer systems as servers. A computer system may therefore detect the performance of the computer network in delivering the data streams that it receives from other servers, and may utilize the network performance information while functioning as a server by apportioning the data stream among the routing path sets according to the network performance information. The computer systems may also share this network performance information, such as by adding network performance descriptors to the data stream that it transmits, and to the data streams of other servers that it retransmits to other clients. A computer system may also receive such network performance descriptors added to the data streams by other computer systems, and may utilize the network performance information in the network performance descriptors while operating as a server in the apportionment of its data stream.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 10 is an illustration of yet another network comprising a variety of routes connecting a set of computer systems.

FIG. 11 is an illustration of a set of routing path sets that may be formulated with respect to the network illustrated in FIG. 10.

FIG. 12 is a table of route delay reports and corresponding adjustments to the apportionments of the routing path sets of FIG. 11.

DETAILED DESCRIPTION

Figure 1:
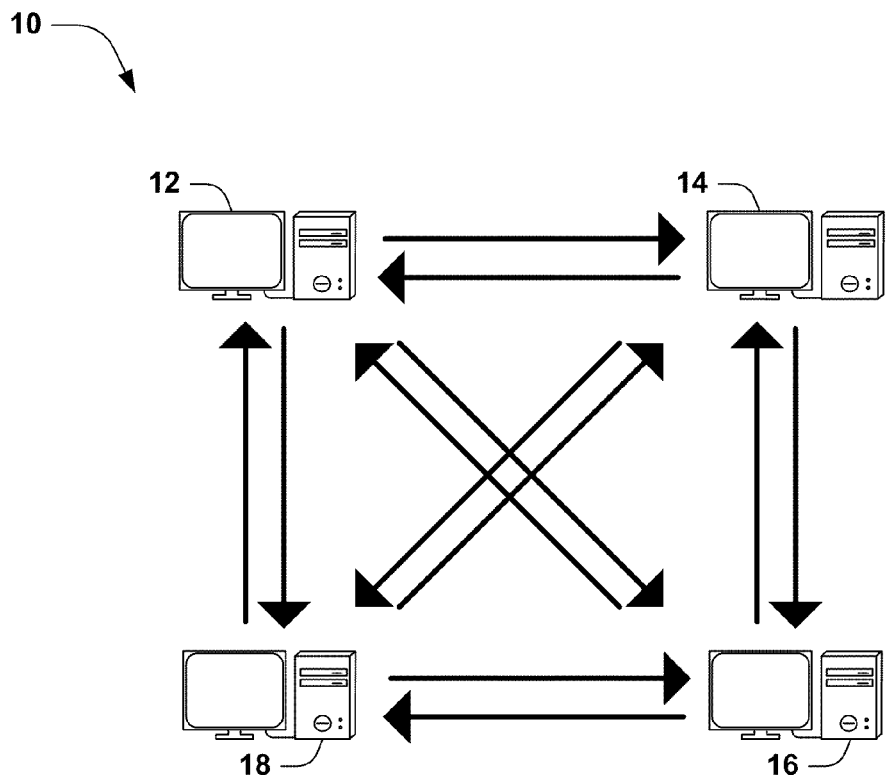
FIG. 1 is an illustration of an exemplary network topology depicting the utilization of routes in a network of computer systems.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Many computing tasks involve the exchange of data among computer systems over a computer network, such as a local area network or the internet. The quality of the performance of the task is often related to the manner in which the network is used by the computer systems, such as the network topology by which the computer systems exchange data. In turn, the performance of the network topology may depend on the characteristics of the network, such as the achievable bandwidth between a computer system sending some data and a computer system receiving the data. An advantageous choice of the network topology in light the capabilities of the network among the computer systems may significantly improve the quality of performance of the computing task.

As one example, a videoconferencing session among four computer systems, where each computer system produces a video data stream depicting its user and serves the video data stream to the other computer systems in the videoconferencing session, often involves the exchange of a significant amount of data. An incorrect choice of network topology may result in delays in exchanging the video data streams among the computer systems, leading to poor quality video or frequent pauses in the video and audio streams, while a correct choice of network topology may reduce such defects and may provide a smoother, more consistent videoconferencing experience.

Two contrasting examples are illustrated in FIGS. 1-4, in which alternative network topologies may be selected for a networked computing task such as a videoconferencing session. FIGS. 1-4 all involve an exemplary computing task involving four computer systems 12, 14, 16, 18 connected via a computer network in order to provide a videoconferencing session. The computer systems 12, 14, 16, 18 may be located nearby and connected by a high-performance local area network (LAN), or may be distant and connected by a comparatively low-performance internet connection, etc. The network link from a first machine 12 to a second machine 14 has two characteristics of particular note: the upload bandwidth of the first machine 12, which defines the rate at which the first machine 12 can send data along the network link, and the download bandwidth of the second machine 14, which defines the rate at which the second machine 14 can receive data along the network link. The maximum rate of sending data across this network link, therefore, is the lesser of the upload bandwidth of the first machine 12 and the download bandwidth of the second machine 14. In most cases, the upload bandwidth of a network connection is significantly smaller than the download bandwidth, so the network connection is usually limited by the upload bandwidth (and the examples presented herein will focus on the upload bandwidth as the main characteristic defining the capabilities of the network.)

Another relevant characteristic relates to the queuing of data to be uploaded. When a computer system allocates more data for sending than the immediate upload capacity of the network can handle, the computer system may queue the excess data for sending when upload bandwidth is available. An additional queuing delay in sending the data may therefore arise, due to the period of time that the data remains in the queue awaiting uploading. If the computer system continues to allocate for sending more data than its upload capacity allows, the size of the queue may continue to grow, thereby increasing the queuing delay.

Figure 2:
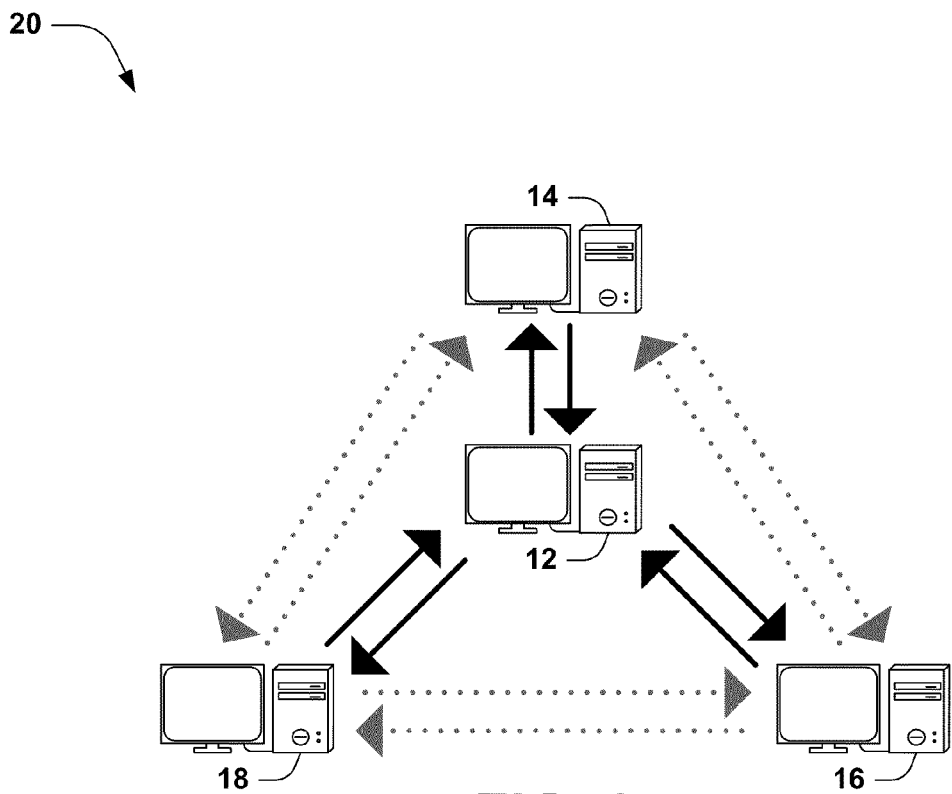
FIG. 2 is an illustration of another exemplary network topology depicting the utilization of routes in a network of computer systems.

In FIGS. 1-2, the four computer systems 12, 14, 16, 18 are interconnected by high-bandwidth connections, where each machine is capable of sending data at a high rate across the network link (e.g., on the order of one megabyte per second), as depicted by the large arrows representing each unidirectional network link. The network topology chosen for the videoconferencing task may advantageously rely on the high bandwidth of the network connections to promote high-quality videoconferencing. In the example 10 of FIG. 1, the computer systems 12, 14, 16, 18 are configured to send the videoconferencing stream to all other computer systems, thereby producing a multicasting network topology, where each server directly sends all data to all clients. Because the upload bandwidth of the computer systems 12, 14, 16, 18 is large, the network is capable of exchanging the videoconferencing data among each computer system and all of its client computer systems at a high rate, and the queuing delay may remain small or zero. The resulting videoconference presents low latency (i.e., a small delay between the generation of the data stream and its receipt by each client) and a minimum of administrative overhead.

FIG. 2 illustrates an example 20 featuring a less advantageous configuration, in which one computer system 12 is designated as a centralized server 22 for redistribution of the video data streams. The other computer systems 14, 16, 18 send their video data streams to the centralized server 22, which redistributes all of the video data. This example 20 is less efficient, because the high bandwidth between the other computer systems 14, 16, 18 is sufficient for sending the video data streams, but is unused, while the bandwidth of the centralized server 22 is burdened with retransmission responsibilities that might be unnecessary. Moreover, the data streams between the other computer systems 14, 16, 18 make an extra trip through the centralized server 22 before reaching their destination at the other computers 14, 16, 18. The data streams routed in this manner experience more latency (greater transmission delay) than in the example 10 of FIG. 1. Thus, the centralized network topology in the example 20 of FIG. 2 is less advantageous for this network than the multicasting network topology in the example 10 of FIG. 1.

Figure 3:
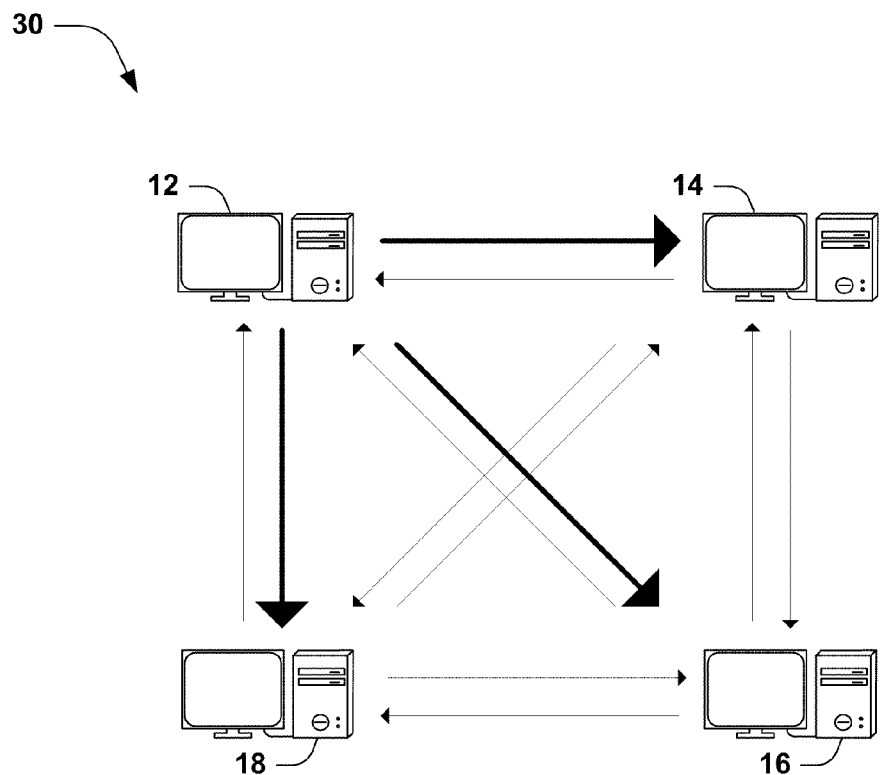
FIG. 3 is an illustration of yet another exemplary network topology depicting the utilization of routes in a network of computer systems.
Figure 4:
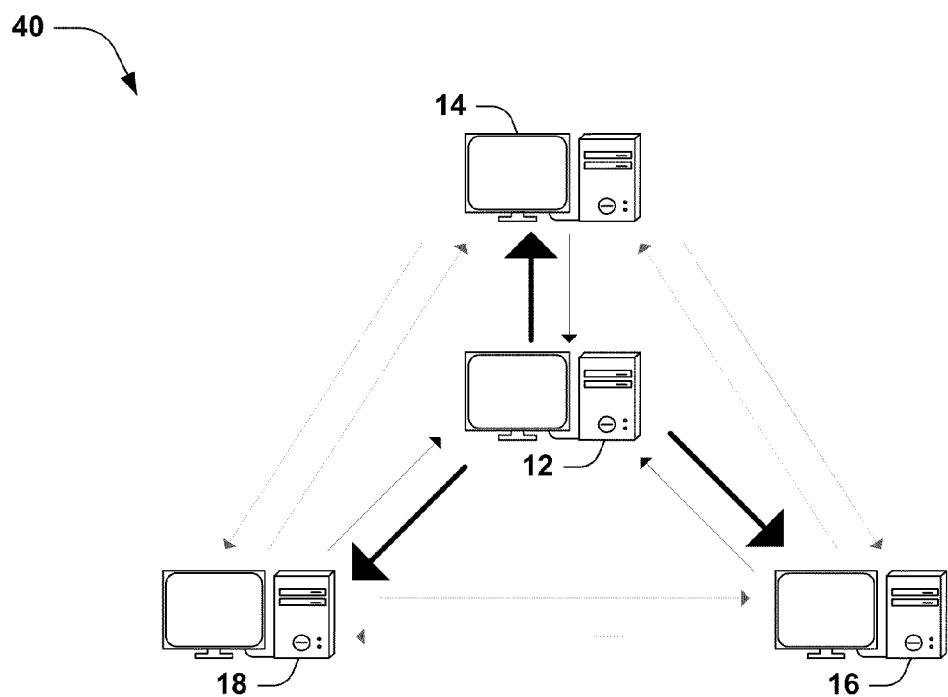
FIG. 4 is an illustration of yet another exemplary network topology depicting the utilization of routes in a network of computer systems.

FIGS. 3-4 illustrate the same computer systems 12, 14, 16, 18 in the same network topologies (an example 30 in FIG. 3 showing a multicasting network topology, and an example 40 in FIG. 4 showing a centralized network topology.) However, the network characteristics in these examples 30, 40 are different: one computer system 12 still has high upload bandwidth, but the other three computer systems 14, 16, 18 have low upload bandwidth. (Again, it is presumed that download bandwidth is plentiful for all computer systems 12, 14, 16, 18, even despite the low upload bandwidth of the other computer systems 14, 16, 18. This scenario is common in home/commercial-based broadband connections, where users are presumed to be more interested in downloading at a fast rate than in uploading data to other computer systems.)

In the multicasting network topology in the example 30 of FIG. 3, the upload resources of each computer system 12, 14, 16, 18 are equally utilized to redistribute its video data stream. While one computer system 12 can handle this distribution adequately, the restricted upload capacity of the other computer systems 14, 16, 18 are overly taxed by having to resend the video data stream three times. These other computer systems 14, 16, 18 may therefore exhibit a queuing delay in the sending of the data streams, which may lead to latency effects, such as pauses in the video feed, for all video data streams sent by these computer systems 14, 16, 18 (including the video data stream sent to the computer system 12, despite its high-bandwidth upload and download capabilities.)

By contrast, in the example 40 of FIG. 4, the computer system 12 having plentiful upload bandwidth is again designated as the centralized server 22 with the task of redistributing the video data stream for all of the computer systems 14, 16, 18. The video data streams in this example 40 feature a small amount of latency due to the routing through the centralized server 22, and the network connections among these computer systems 14, 16, 18 are unutilized. However, the video data streams in this example 40 are not as limited by the restricted upload capacity of the other computer systems 14, 16, 18, and the video data streams may be exchanged and displayed with shorter queuing delays and less overall latency. The performance of the videoconferencing data is therefore improved over the example 30 of FIG. 3.

Figure 5:
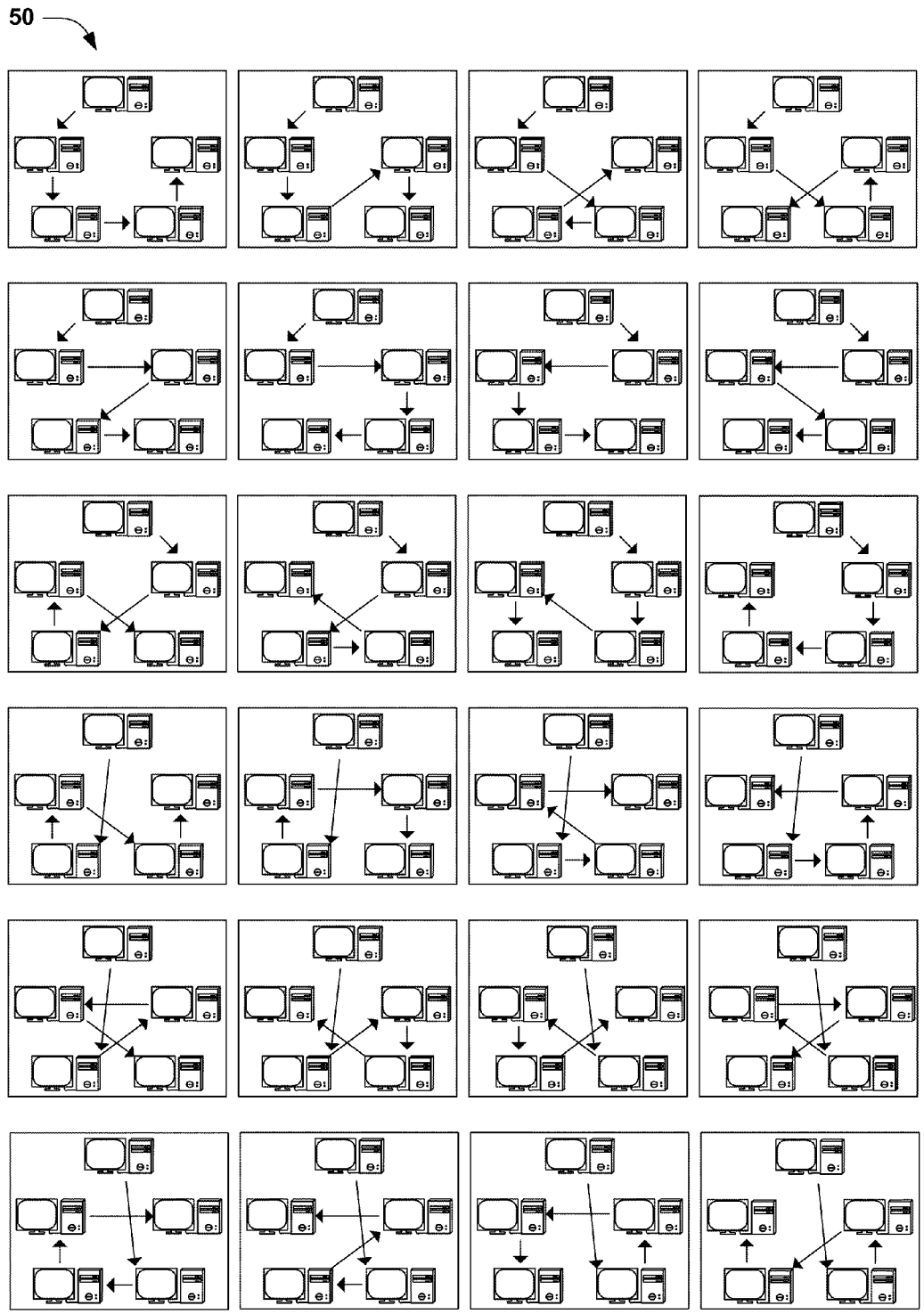
FIG. 5 is an illustration of a large set of network topologies depicting the utilization of routes in a network of computer systems.

It may be appreciated through the review of FIGS. 1-4 that advantages may arise from the selection of a network topology for a networked computing task in light of the network characteristics. However, achieving an appropriate network topology for a particular task may be made difficult by several factors. First, the network characteristics of the computer systems may change over time; for example, a computer system with high upload bandwidth may have some of its upload bandwidth diverted by another task. A network topology utilizing this computer system as a high-upload-bandwidth node may therefore lose some efficiency as its capabilities change. Second, the number of computer systems involved in the networked computing task may change over time; for example, a computer system designated as a centralized server (such as the centralized server 22 of FIGS. 2 and 4) may disconnect, thereby hampering any network topology depending on its functioning as the centralized server. Third, the number of computer systems may scale up to large numbers, such that formulating complex routing paths for data streams becomes computationally difficult. One example 50 is illustrated in FIG. 5, which illustrates the wide variety of routing paths that may be chosen for serially routing a data stream through four computer systems on a network. Moreover, this complexity scales more than factorially; for example, in a network with ten clients, each client may send to the other clients according to 986,409 serial routing paths. Thus, deciding among all of the permutations and combinations, especially in a centralized manner for all clients, becomes a difficult computational problem.

An alternative technique involves the use of multiple routing path sets for sending the data stream to the clients. As used herein, a routing path set comprises a set of routing paths that together cover the client set, i.e., where all of the clients that are to receive the data stream are included. The routing path set may comprise multiple routing paths, where each routing path begins at the server and terminates at a client after passing through zero or more other clients. The routing path comprises a series of routes, where each route comprises a network connection between two computer systems across which the data stream is sent. (The route is rate-limited by the lesser of the upload bandwidth of the sender and the download bandwidth of the receiver, and it is presumed herein that the former is rate-limiting and therefore defines the capacity of the route.)

Figure 6:
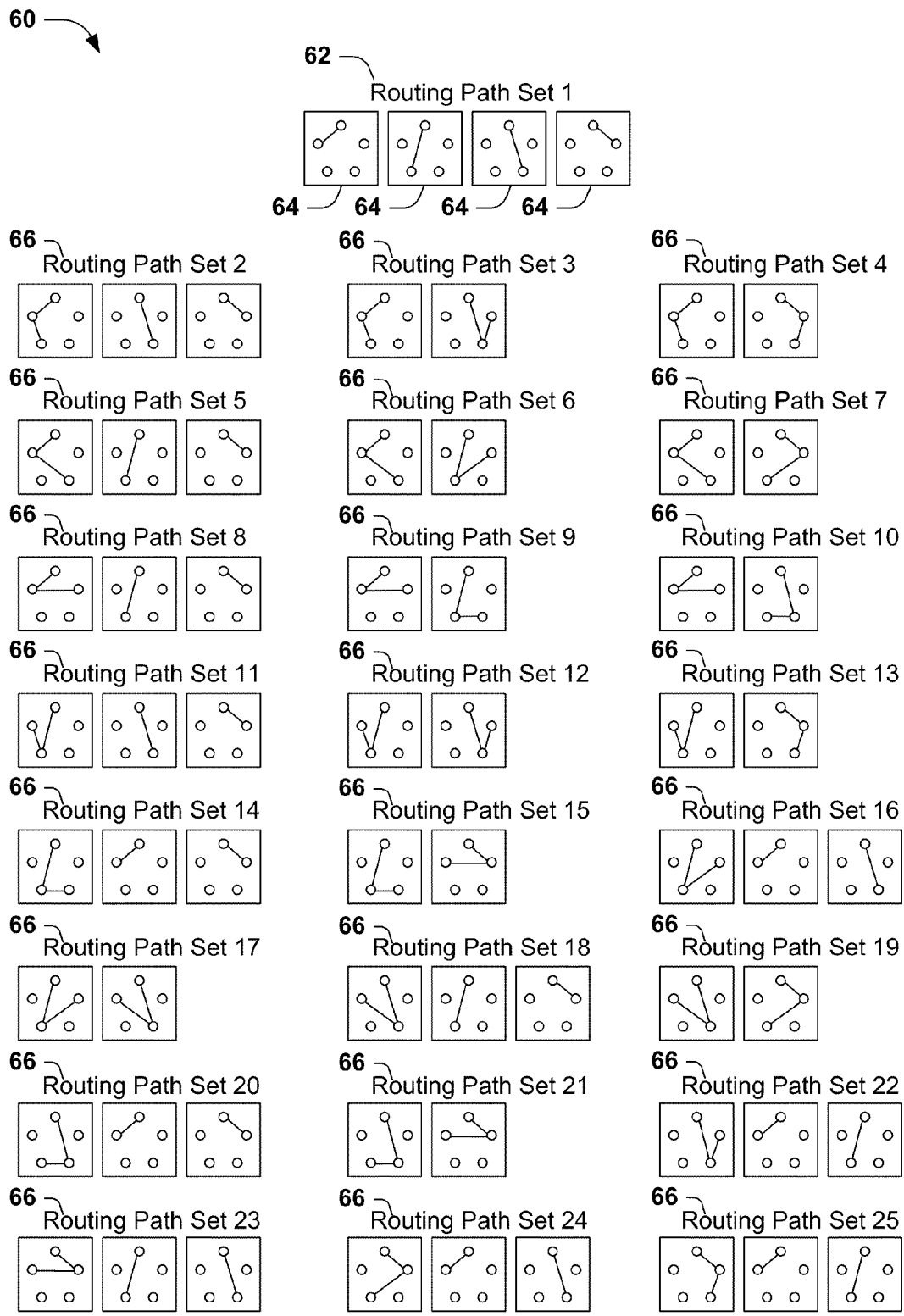
FIG. 6 is an illustration of a large set of routing path sets depicting the utilization of routes in a network of computer systems.

Some exemplary routing path sets 60 are illustrated in FIG. 6, wherein the routing paths are limited to at most two routes, which have at least zero and at most one client machine between the server (the computer system at the top of the routing path illustration) and the terminal client of the routing path. The first routing path set 62 only includes routing paths 64 that have one route each; these routing paths represent a direct routing approach, such as may be used during a multicast network topology. The other routing path sets 66 include routing paths of longer length, i.e. with two routes, with some one-route routing paths to reach the clients not otherwise included. It will be appreciated that every routing path set 62, 66 includes every client, either as a terminal client in a one-route or two-route routing path or as an intermediary client in a two-route routing path.

In view of the concept of routing path sets, the alternative approach to choosing routing paths for the data stream involves a server configured to send portions of the data stream to the clients among a variety of routing path sets. The routing path for a particular portion of the data stream may be specified along with the data stream, such that a client who receives the portion may determine the next client to which the portion should be forwarded. Because each routing path set includes all of the clients, the data stream may be arbitrarily apportioned among all routing path sets, such that the data sent to each client by a variety of routes will comprise the entire data stream.

Because the routing path sets collectively utilize all of the pertinent routes among the clients and the server, the data stream is sent across both the best routes (those having plenty of spare capacity for the portion sent thereacross) and the worst routes (those having no spare capacity for the portion sent thereacross, which therefore requires the uploading computer system of that route to queue the portion until capacity becomes available.) If the server can detect information related to the performance of the computer network, such as the routing delay of a route, it may accordingly adjust the apportionment of the data stream among the various routing path sets based on the routes used therein.

Several potential advantages may arise from this approach. As one example, the computational burden of adjusting the apportionment of the data stream among the routing paths may be limited to the server, without regard to the apportionments that other servers in the computer network may be applying. Hence, the computational burden of the apportionment is distributed among the servers, and does not involve a centralized server for determining the advantageous apportionments among the routing paths for all servers. This distribution may permit the application of more computationally burdensome apportionment algorithms that yield sophisticated and well-chosen results. As a second example, the ongoing monitoring of the dynamic network characteristics (number of clients, upload capacity among various network links, etc.) may be directly and implicitly utilized by the apportionment, and hence the server may implicitly adjust for significant network events (the addition or disappearance of a client or a data stream) without special programming to anticipate and handle such events.

Figure 7:
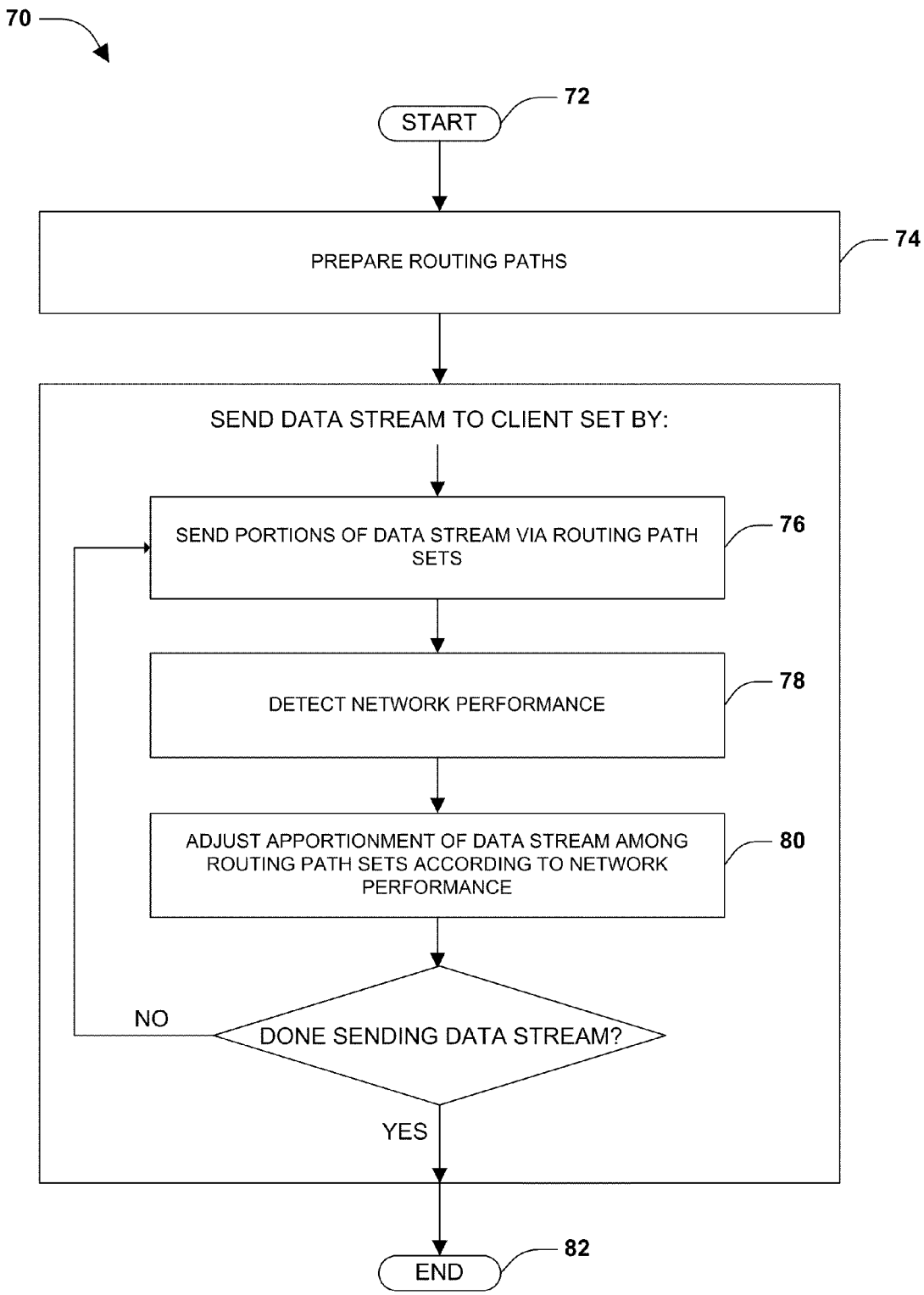
FIG. 7 is a flow diagram illustrating a method of sending a data stream from a server to a client set over a computer network.

Various embodiments may be devised to encapsulate these techniques. One embodiment method is illustrated in FIG. 7, which presents a flow diagram of an exemplary method 70 of sending a data stream from a server to a client set over a computer network. The exemplary method begins at 72 and involves preparing at least one routing path set covering the client set 74, wherein each routing path set comprises at least one routing path, and wherein a routing path comprises at least one route between the server and a client through zero or more other clients. For example, the method may involve constructing data representations of the routing path sets 62, 66 illustrated in FIG. 6. The exemplary method 70 also involves sending the data stream to the client set by sending portions of the data stream to the clients via the routing set paths 76, detecting the network performance along the routes across which the portions of the data stream are sent 78, and adjusting the apportionment of the data stream among the routing path sets according to the network performance 80. For example, the computer system may take a portion of the data stream (e.g., the most recent second of video in a videoconferencing data stream), apportion it among the routing path sets, and send one portion along a routing path set. The same portion is sent through all of the routing paths in the routing path set, so that all of the clients receive the portion. The computer system then detects the performance of each route in sending the portions of the data stream, e.g., by receiving latency feedback from the clients that utilize the route, and may accordingly adjust the apportionment of the data stream among the routing path sets that include the route. The method may continue to be applied to the data stream according to these mechanisms until the sending of the data stream is complete (e.g., the computer system terminates the videoconferencing session for which the video data stream was supplied), at which point the exemplary method ends at 82.

Figure 8:
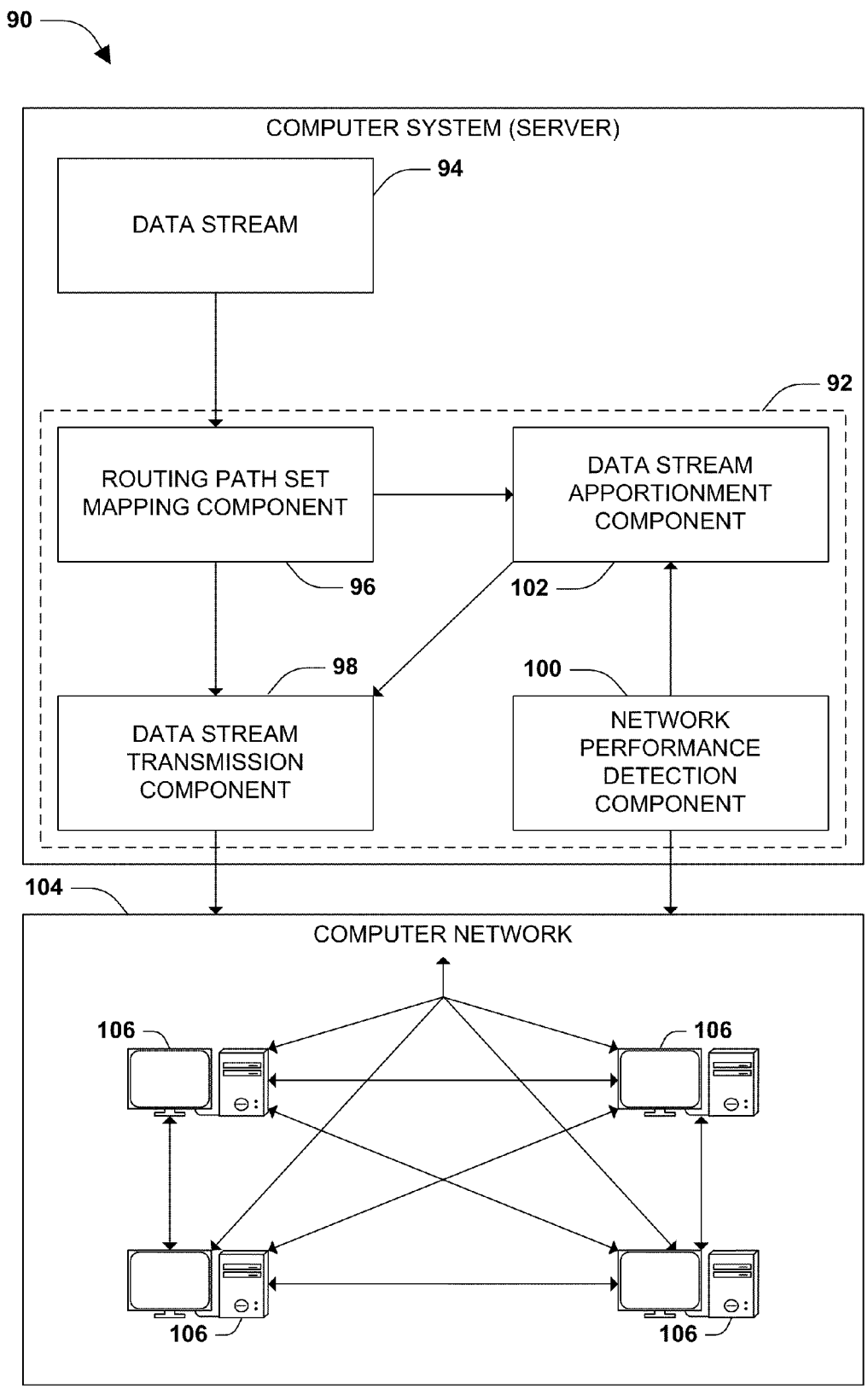
FIG. 8 is a component block diagram illustrating a system for sending a data stream from a server to a client set over a computer network.

Another embodiment is illustrated in FIG. 8, which presents a component block diagram 90 of an exemplary system 92 for sending a data stream 94 to a client set over a computer network. It is presumed that the exemplary system 92 has access to the data stream 94 to be served, which may be generated by the computer system hosting the exemplary system 92 or received from an external source. It is also presumed that the exemplary system 94 has also identified a client set 106, comprising a set of computer systems accessible via a network 104 to whom the data stream 94 is to be provided. This exemplary system 92 comprises (at least) four components. First, the computer system 92 comprises a routing path set mapping component 96 configured to generate at least one routing path set covering the client set 106, respective routing path sets comprising at least one routing path comprising at least one route between the server (i.e., the computer system hosting the exemplary system 94) and a client through at least zero other clients. For example, the routing path set mapping component 96 may generate data representations of the routing path sets 62, 66 illustrated in FIG. 6. The routing path set mapping component 96 may store the prepared routing maps in memory, or may be configured to generate the desired maps on the fly, etc. Also, the routing path set mapping component 96 may be configured to support the generation of a new set of routing path sets in light of changes to the number and availability of clients in the client set 106.

The exemplary system 94 of FIG. 8 also comprises a data stream transmission component 98 configured to send portions of the data stream 94 to the clients of the client set 106 via the routing path sets generated by the routing path set mapping component 96. For example, the data stream transmission component 98 may initially apportion the data stream 94 equally among all of the routing path sets; this may be an advantageous technique for initiating the apportionment, as no data is yet available for the capacity and performance of any of the routes of the network 104. The data stream transmission component 98 is not necessarily involved in the adjustment of the apportionment, but is primarily directed toward apportioning the data stream 94 among the routing path sets, and in sending the portions of the data stream 94 allocated to each routing path set.

The exemplary system 92 of FIG. 8 also comprises a network performance detection component 100 configured to detect the performance of the network 104 while sending the portions of the data stream 94 to the clients of the client set 106. The network performance detection component 100 monitors the condition and capabilities of the network 104 to determine the performance of the routes (and the computer systems on each end of each route, and in particular the uploading computer system of each route) in the transmission and reception of the data stream 94. The detected information may then be stored, and possibly combined with previous samplings of the performance for a route, to represent a map describing the performance of the routes comprising the network 104.

The exemplary system 92 of FIG. 8 also comprises a data stream apportionment component 102 configured to adjust the apportionment of the data stream 94 among the routing path sets by the data stream transmission component 98 according to the network performance detected by the network performance detection component 100. The data stream apportionment component 102 operates on the relative performance of the routes as detected by the network performance detection component 100, and accordingly adjusts the apportionment of the data stream 94 among the routing path sets. For example, if a route is detected to be performing well (with high capacity and a short routing delay), then the routing path sets that include that route may be adjusted for an increased apportionment of the data stream 94. Conversely, a route detected to have little capacity and a long routing delay may be less utilized by reducing the apportionments of the data stream 94 for the routing path sets having routing paths that include the route.

The components 96, 98, 100, 102 configured in this manner enable the exemplary system 92 of FIG. 8 to send the data stream 94 to the clients of the client set 106 over the network 104. The components 96, 98, 100, 102 may continue to interoperate, with continued detection of network performance and the adjustment of the apportionments of the data stream 94, in response to changing network conditions, until the sending of the data stream 94 is complete (e.g., the user terminates the videoconference.)

Figure 9:
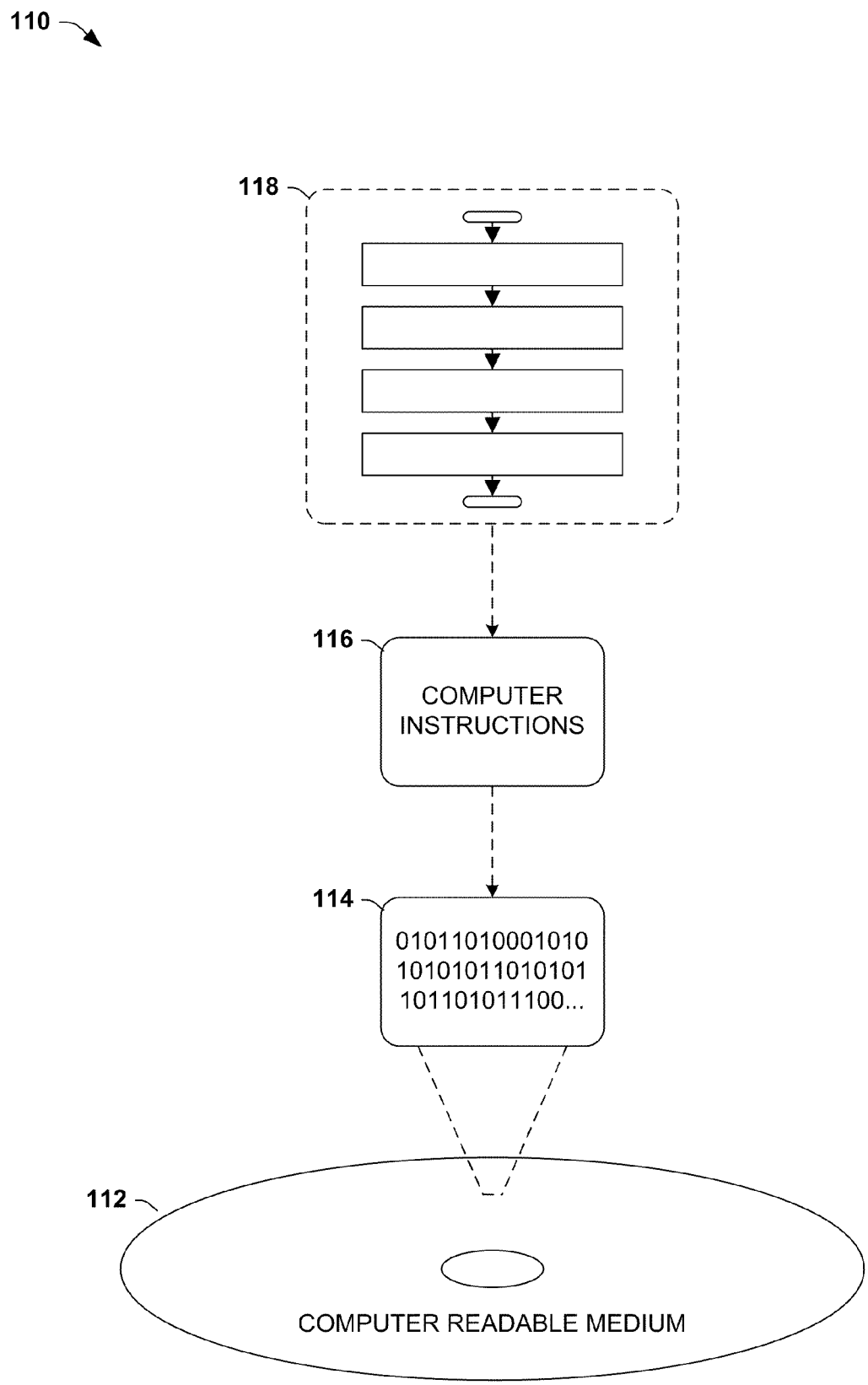
FIG. 9 is an illustration of an exemplary computer-readable medium comprising processor-executable instructions configured to embody the techniques disclosed herein.

Still another embodiment involves a computer-readable medium comprising processor-executable instructions configured to apply the techniques presented herein. An exemplary computer-readable medium that may be devised in these ways is illustrated in FIG. 9, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment 118, the processor-executable instructions 116 may be configured to perform a method of sending a data stream from a server to a client set over a computer network, such as the exemplary method 70 of FIG. 7. In another such embodiment, the processor-executable instructions 116 may be configured to implement a system for sending a data stream from a server to a client set over a computer network, such as the exemplary system 90 of FIG. 8. Many such computer-readable media may be devised by those of ordinary skill in the art that are configured to operate in accordance with the techniques presented herein.

These techniques and associated embodiments may be applied toward many scenarios for serving a data stream to a number of clients. An audioconferencing or videoconferencing scenario may find such techniques particularly suitable, because a participating computer system operates as a server in this scenario by generating an audio and/or video data stream to be shared with a variety of clients. Moreover, the other client computer systems may also operate as servers of the audio and/or video data streams for their respective users, so each participating computer system may utilize embodiments these techniques both as a server and as a client. Some variations may advantageously utilize on the dual configuration of a computer system as both a server and a client.

These techniques may also be applied to scenarios other than conferencing sessions, such as a network multiprocessing scenario, where several computer systems interoperate on a shared computing task, such as a data processing task that involves complex mathematical analysis that may be executed in parallel. The computer systems may operate in parallel on various data units of the data processing task, such as various portions of the problem domain. The computer systems may be arranged to perform different functions on the same data unit, and configured to exchange various data units in series. Alternatively, the computer systems may perform various mathematical analysis tasks on the data units in arbitrary order, and upon completing a mathematical task, may provide the completed analysis (and, if appropriate, the transformed data unit) to the other computer systems. In both scenarios, the computer systems operate as servers upon completing an analysis task on a data unit, and thereby serve the information generated by the analysis and/or the transformed data unit to the other computer systems. This service may be implemented as the service of a data stream to all other computer systems as clients in accordance with the techniques discussed herein. Those of ordinary skill in the art may be able to devise many such scenarios for providing a data stream from a server to a number of clients that operate in accordance with the techniques discussed herein.

Many variations of these techniques and associated embodiments may be devised that may provide additional advantages and/or reduce disadvantages associated with other embodiments and other techniques. The variations provided herein may be included in many embodiments, including the exemplary method 70 of FIG. 7, the exemplary system 90 of FIG. 8, and the exemplary computer-readable medium 110 of FIG. 9, either alone or in combination with other variations.

One variation for these techniques relates to the metric(s) used to measure the network performance. As one example, the network performance may be detected by measuring the routing delay —the amount of time consumed by the network in sending a particular portion of a data stream across a particular route of the network. As another example, the network performance may be detected by measuring the average bitrate across a particular route of the network over a period of time, and then used either as a metric (e.g., "this route is capable of 5500 kbps throughput") or in computing the current load of the route as a metric (e.g., "this route is being utilized at 90% throughput.") As a third example, the network performance may be detected according to one or more heuristics, such as the total bitrate of the data streams currently being transmitted across the network and the number of clients receiving the data streams as compared with the total network bandwidth. Many such metrics may be utilized, in isolation or in combination, to measure the performance of the network while implementing the techniques described herein.

Another variation of these techniques involves the selection of routing paths comprising the routing path sets. Since the number of routing path sets may grow more than factorially for a given set of networked computer systems, the routing path sets by which the data is apportioned may be limited by various criteria. The examples used herein, including the exemplary routing path sets of FIG. 6, involve routing path sets having routing paths of a maximum length of two; i.e., the routing paths send data to clients through at most one other client. This limitation may present a practical tradeoff between the utilization of network resources of other clients and the costs of using protracted routing paths, such as the greater unreliability of a long routing path through many clients. The number of possible routing paths among n clients in light of this restriction is $(n-1)+(n-1)*(n-2)$. Although the number of routing path combinations among the clients is a polynomial relationship as n scales up, the number of potential routing sets is much more feasibly scalable than techniques that consider all possible routing paths, which has a factorial number of routing path combinations. For larger data sets, additional scalability may be achieved by further limiting the routing paths, e.g., by selecting a subset of clients for retransmission, such that routing paths may be excluded from consideration that feature non-terminal clients that are not within this subset. Many criteria may be applied to the selection of routing paths comprising the routing path sets by those of ordinary skill in the art that operate in accordance with the techniques described herein.

A third variation of these techniques involves the manner of detecting the network performance. Because the apportionment of the data stream among the routing path sets is advantageously adjusted based on the performance of the routes, the manner in which the server monitors the conditions of the network and detects the performance of the routes may affect the quality of the implemented techniques. This monitoring may be active, where the network performance detection component interfaces with the computer systems and/or the routes and monitors the bandwidth. For instance, the server may conduct ping tests on the client computer systems, and may specify the route along which the ping is intended to propagate. The data returned by the ping tests may be analyzed to evaluate the latency of the routes along the routing path of the ping test. Alternatively, the server may adopt a passive network performance detection scheme, wherein the clients of the network notify the server of the performance experienced along the routes. For example, for each route, the computer system that receives a portion of the data stream along the route may detect the amount of time required for the uploading computer system of the route to upload the portion of the data stream, and may report this data to the server.

An example of the passive notification technique is illustrated in FIGS. 10-12, which depict (respectively) a network topology among four computer systems, some routing path sets pertaining thereto, and the dynamic apportionment of the routes due to network performance reports from the computer systems. FIG. 10 presents an illustration 120 of a routing topology among computer systems 1, 2, 3, and 4, which are connected by a bidirectional network. Each route in the network is labeled with a letter indicating one-half of the route comprising the unidirectional transmission from one computer system to the other computer system. For example, route A indicates the route used to transmit from computer 1 to computer 2, while route B indicates the route used to transmit from computer 2 to computer 1. Because the network performance bottleneck of the route may be the upload bandwidth of the computer system in the networking relationship, a route may have faster performance in one direction than in the other direction. This network topology serves as the basis for the examples of FIGS. 11 and 12, wherein computer system 1 is designated as the server and computer systems 2, 3, and 4 are designated as clients. (It may be observed that while all of the pertinent routes in this distribution are represented in the routing sets, some routes that are not pertinent are not included; specifically, routes B, D, and F are not pertinent to this example, because the clients do not need to send data back to the server in this example.)

FIG. 11 presents an example 130 of some routing path sets 132 that may be generated to represent communication in the network topology of FIG. 10 among computer system 1 (the server) and the other computer systems (the clients.) This example 130 illustrates routing path sets 132 having the limitation of restricting the routing paths to maximum lengths of two routes, i.e., with at most one intermediary client between the server (computer system 1 in FIG. 10) and the terminal client in the routing path. Again, it may be observed that every routing path set includes every client in one of the routing paths, such that even if the data stream is apportioned among all of the routing path sets 132, every client receives the entire data stream.

FIG. 12 presents an example 140 illustrating an exemplary dynamic apportionment of the data stream among the routing path sets 132 according to the detection of the network performance by the server. In this example 140, the server (computer system 1 in FIG. 120) passively detects the network performance by receiving and responding to notifications 142 of the route performance sent by the clients to the server. In this example 140, the notifications 142 in this example simply indicate that particular routes are fast or slow; however, the clients may provide quantitative statistics (e.g., kilobits or megabits per second) that the server may utilize in proportionately adjusting the apportionment. Also, in this example 140, the clients on the receiving end of a route perform the assessment of the route performance and send a notification 142 to the server of the detected performance result.

The example 140 of FIG. 12 begins with an equal apportionment of the data stream among all routing path sets 132. Upon receiving a notification 142 from computer system 4 that route K is slow, the server refers to the routing path sets 132 to determine which routing path sets 132 involve route K, and discovers that only routing path set 4 includes K. The server therefore reduces the apportionment of the data stream allotted to routing path set 4, and proportionally raises the allotment among the remaining routing path sets 132. The server next receives a notification 142 that route L is fast, and responds by increasing the apportionment of the routing path set 132 that includes route L (i.e., routing path set 5) and diminishing the apportionments of the other routing path sets 132. As a result of the series of notifications 142, the server may continue to adjust the allocation of the data stream among the routing path sets 132 throughout the duration of the data stream service by passively monitoring the dynamics of the network, based on upon the notifications 142 of network performance provided by the clients.

Another variation among embodiments of these techniques relates to the manner in which a computer system measures the network performance, based on the metric(s) chosen for this determination. As one example utilizing the routing delay as the network performance indicator, a computer system may measure the network performance according to the queuing delay of a route, comprising the length of time between generating or receiving a portion of a data stream and sending the data stream to another computer system via a particular route. This measurement technique may be advantageous by limiting the measurement burden to one computer system, and thereby avoiding any cooperation with another computer system in assessing the routing delay; however, this metric only reflects the internal delays of the computer system, and does not reflect, e.g., the transmission duration of the route, or any queuing that may occur outside of the computer system (e.g., within a buffer of a network card, or by the LAN to which the computer system is connected.)

Other examples involve the use of timestamps, where the server and the clients add a timestamp to a portion of the data stream before sending it to another client, and the receiving client detects the network performance according to the timestamp. As another example, all of the computer systems may synchronize their clocks (either among the computer systems or with an outside provider, such as the atomic clock), and a sending computer system may attach a timestamp to a data stream portion that it receives or generates, which the receiving computer system compares with the current time upon receipt to assess the performance of the route. This metric reflects a more comprehensive measurement of the network performance, but acutely depends on an accurate synchronization among all computer systems; if one computer system is even moderately desynchronized with a sender, the synchronicity gap will be reflected in every metric, thereby skewing the reported performance. For example, if the time at the sender is even slightly behind the time at the recipient, the network performance will be inaccurately large, and the reported performance will be inaccurately low. Conversely, if the time at the sender is even slightly ahead of the time at the recipient, the network performance will be inaccurately small, and the reported performance will be inaccurately high.

An alternative approach that does not involve time synchronization is a relative one-way upload queuing delay metric. According to this metric, the sender again attaches a timestamp to the portion of the data stream, and the recipient again compares it with its current time. However, instead of using the result as an absolute time measurement, the recipient uses the result as a baseline against which subsequent measurements are relatively assessed. Specifically, the recipient keeps track of the minimum one-way upload queuing delay observed throughout the communications with the sender along the route, and then reports subsequent metrics as the intervals exceeding the shortest one-way upload queuing delay thus observed. Hence, the recipients thereby track and report the relative one-way upload queuing delay along each route for which it is a recipient. This alternative approach factors out the baseline transmission delay of the route (i.e., the minimum delay involved in the sending of data across the route); but this baseline transmission delay is mainly a physical property of the network and is not subject to significant change, so it is not a significant factor in the routing decisions. Thus, as long as the baseline transmission delay remains approximately equivalent for all routes involved in the apportionment, factoring it out of the routing delay metric may not significantly alter the results of the apportionment. The relative one-way upload queuing delay may therefore serve as an acceptably accurate metric of routing performance without depending on a clock synchronization among the participants.

Another aspect of these techniques that may vary among embodiments involves the monitoring of the network status by the client computer systems, and in particular the mechanism of notifying the server of the observations of the clients. Generally, at least one client is configured to detect the network performance while receiving portions of the data stream from the server and other clients, and to send the detected routing delays of the routes to the server. This mechanism, too, may be implemented according to many variations in alternative embodiments, where some variations have some advantages and/or reduce some disadvantages with respect to other variations. As one example, the clients may simply notify the server in a separate network communication. While this mechanism is not likely to tax the network, since the data observed with each notification may be as small as a few bytes, this mechanism does involve sending and receiving a new set of messages in addition to the myriad network communications related to the data stream. This mechanism may therefore not scale well; if a large number of clients receives the data stream, the server may have to contend with all of the clients frequently sending routing information messages, which may comprise a significant number of messages. This disadvantage may be reduced by several techniques, such as sending routing messages periodically (where the periods may lengthen as the number of clients scales up), or by sending messages only when routing performance significantly changes, etc.

Another technique for communicating the routing information back to the server may be advantageous in scenarios where one or more clients are also configured as servers of other data stream, such as audioconferencing and videoconferencing. In these scenarios, the first server is the recipient of the other data streams of other clients, and the routing information may be included in the other data streams sent back to the server. Additionally, other clients may also operate as servers (e.g., those that are not currently sending a data stream may choose to become servers in the future), so the network performance information may be generally useful to the computer systems of the network.

According to these observations, the computer systems may be configured to bundle the network performance information with the portions of the data stream exchanged over the network. The computer systems may generate a network performance descriptor, which describes the performance of a route in some manner, and to send one or more network performance descriptors along with the portions of the data stream to the other computer systems with the portions of the data stream. The network performance descriptor may be received by the clients receiving the portion of the data stream, and the information contained therein may be included in the network performance information set retained by the client. Moreover, the client may also add to the portions of the data stream that it receives from other servers and other clients some additional network performance descriptors, e.g., the network performance information that the client detects for the routes in which it is the recipient, before forwarding the portion of the data stream to other clients. Finally, where a client also comprises a second server that sends a second data stream to the server and the other clients, the client may include its detected network performance information (including the information received from other clients) with the portions of the second data stream that are sent to the other clients and to the first server.

The first server, in turn, may be configured to receive the second data stream from the second server (including adding it to its set of network performance information), and may send at least one network performance descriptor with the second data stream to the next client in the routing path of the portion of the second data stream. For example, the first server may include a data stream receiving component configured to receive the second data stream from the second server, and a data stream retransmission component configured to send the second data stream to the next client in the routing path of the second stream. The first server may also adjust its apportionment among the routing path sets according to the network performance descriptors received with the second data stream. In this manner, the network performance information may circulate among the clients, and may eventually return to the server when it receives a portion of a second data stream from a second server.

An example of this exchange of routing information is provided in FIGS. 13-16, which illustrate a network of four computer systems configured to share data streams. In particular, computer system 1 is configured to share a first data stream with computer systems 2-4, while computer system 4 is configured to share a second data stream with computer systems 1-3.

Figure 13:
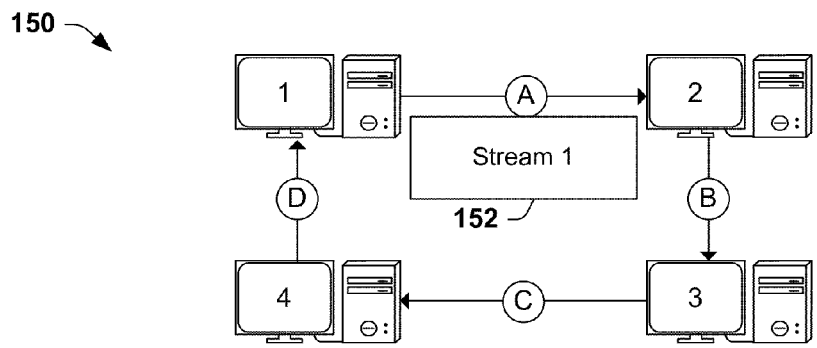
FIG. 13 is an illustration of yet another network comprising a variety of routes connecting a set of computer systems.

In FIG. 13, computer system 1 initiates the delivery of a portion of data stream 1 152 along a routing path comprising route A between computer systems 1 and 2, route B between computer systems 2 and 3, and route C between computer systems 3 and 4. Computer system 1 therefore sends the portion to computer system 2, along with the instructions to forward the portion further along the routing path. Computer system 2 receives the portion of data stream 1 152, and also measures the performance of route A (and the upload queuing delay of computer system 1) in sending the portion of data stream 1 152, such as with reference to a timestamp that computer system 1 may have included with the portion of data stream 1 152.

Figure 14:
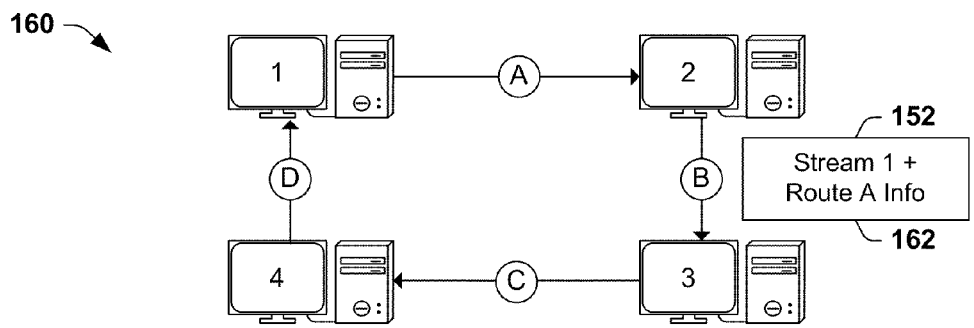
FIG. 14 is an illustration of yet another network comprising a variety of routes connecting a set of computer systems.

In FIG. 14, computer system 2 forwards the portion of data stream 1 152 to computer system 3 via route B, as indicated by the routing path for the portion of data stream 1 152. Computer system 2 also includes with the transmitted portion of data stream 1 152 a route A network performance descriptor 162, based on the network performance detected while receiving the portion of data stream 1 152 in FIG. 13. Computer system 2 may also include a timestamp with the transmitted portion of data stream 1 152, which computer system 3 may use to detect the network performance of route B (and the upload queuing delay of computer system 2) in sending the portion of data stream 1 152.

Figure 15:
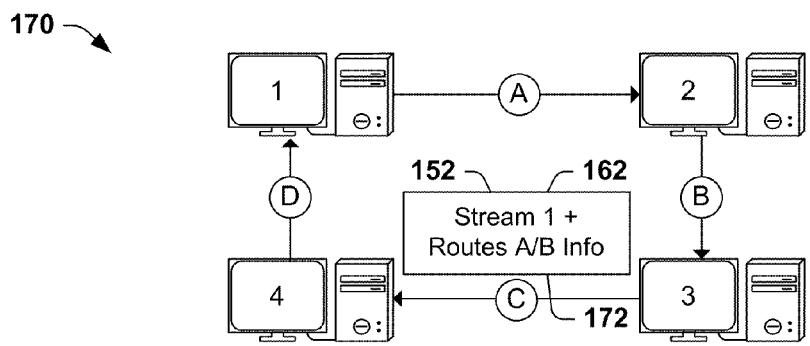
FIG. 15 is an illustration of yet another network comprising a variety of routes connecting a set of computer systems.
Figure 16:
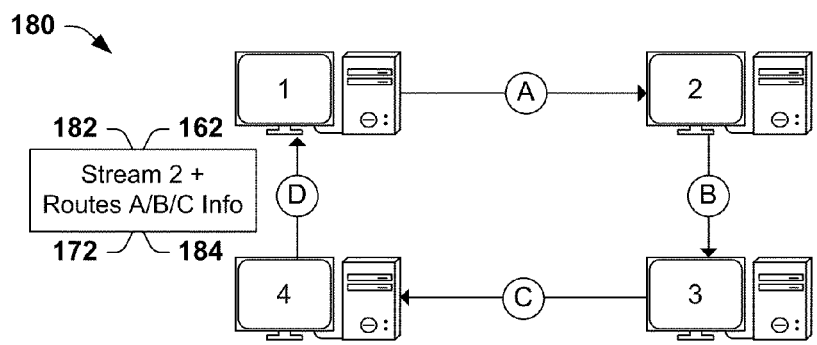
FIG. 16 is an illustration of yet another network comprising a variety of routes connecting a set of computer systems.

FIG. 15 illustrates a similar transaction as in FIG. 14, where computer system 3 sends the portion of data stream 1 152 along the routing path to computer system 4. Computer system 3 also transmits to computer system 4 with the portion of data stream 1 152 the route A network performance descriptor 162 that computer system 3 received with the portion of data stream 1 152, and a route B network performance descriptor 172 based on the network performance of route B that computer system 3 detected while receiving the portion of data stream 1 152 in FIG. 14. Computer system 3 may also include a timestamp, which computer system 4 may use to detect the network performance of route C (and the upload queuing delay of computer system 3) in sending the portion of data stream 1 152.

The transmission illustrated in FIG. 15 ends the routing path for the portion of data stream 1 152, so the network performance descriptors 162, 172 have not yet been propagated back to computer system 1. However, computer system 4 may utilize this information in serving data stream 2 by adjusting the apportionment of the portions of data stream 2 182 among its routing path sets according to the network performance information. Additionally, computer system 1 is a client of data stream 2, and in FIG. 16, computer system 4 includes the route A network performance descriptor 162 and the route B network performance descriptor 172 with a portion of data stream 2 182 sent to computer system 1. Computer system 4 also sends to computer system 1 a route C network performance descriptor 184 based on the network performance of route C that computer system 4 detected while receiving the portion of data stream 1 152 from computer system 3 in FIG. 15. Once again, computer system 4 may also include a timestamp with the portion of data stream 2, which computer system 1 may use to detect the network performance of route D (and the upload queuing delay of computer system 4) in sending the portion of data stream 2 182. In this manner, the network performance information detected during the routing of the portion of data stream 1 152 is returned to the server (computer system 1) for facilitating the improved routing of further portions of data stream 1.

Figure 17:
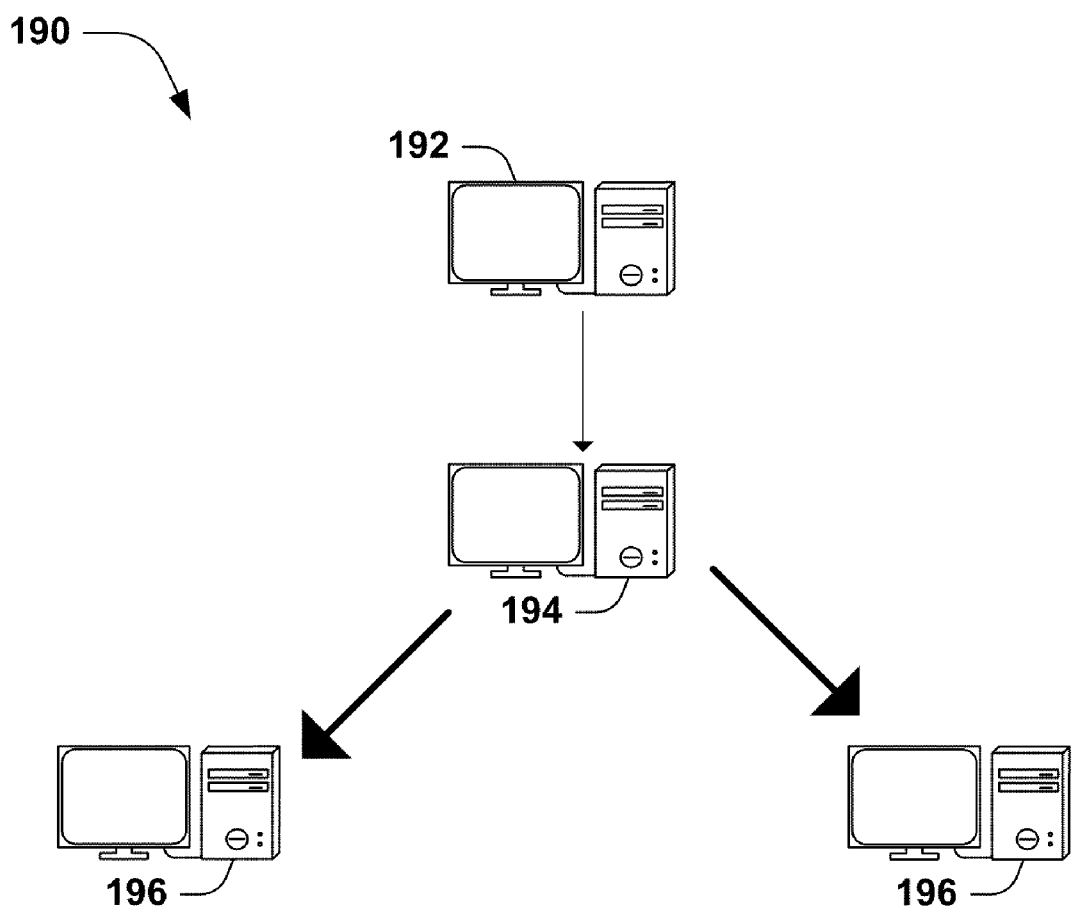
FIG. 17 is an illustration of yet another network comprising a variety of routes connecting a set of computer systems.

Many other variations of these techniques may provide additional advantages and/or reduce disadvantages with respect to other variations of these techniques. As one example, one or more computer systems may be included in the network topology as auxiliary servers, which function to redistribute the portions of the data streams but does not generate its own data stream, and may not be a client of any data stream (i.e., is not configured to consume or render the data stream on behalf of a user.) FIG. 17 presents an example 190 of a network configuration utilizing an auxiliary server 194, which may comprise a high-bandwidth computer system configured to redistribute the data stream of at least one server 192. The at least one server 192 may utilize the auxiliary server 194 by generating routing paths (and routing path sets including the routing paths) including the auxiliary server as an intermediary client in various routing paths, e.g., as the first intermediary client in the routing paths directed to other clients 196, and by not generating routing paths including the auxiliary server 194 as a terminal client, since this may comprise an unnecessary routing. If the auxiliary server 194 demonstrates better-than-average routing performance, the apportionment of the routing paths by the at least one server 192 will automatically adjust to provide greater apportionments to the routing path sets utilizing the auxiliary server 194; and if the auxiliary server demonstrates much greater routing performance than the other clients 196, the apportionment will come to resemble a centralized redistribution of the data streams, such as illustrated in FIG. 4. Other uses of auxiliary servers may be devised by those of ordinary skill in the art while applying the techniques described herein.

As another variation of these techniques, a server may adjust the apportionment of the data stream among the routing path sets in various ways. One technique relates to the frequency of adjusting the apportionment among the routing path sets. If a server is configured to adjust the apportionment upon receiving each notification of network performance information (as illustrated in 12), then the server may spend considerable time making small adjustments to the apportionment; this adjustment may be overly frequent, and may not provide much value to the improvement of the routing performance. In an alternative embodiment, the server is configured to adjust the apportionment among the routing path sets less frequently, which may thereby shift some computing resources to the more valuable tasks of generating the data stream and processing the upload queue. As one example, the server may collect the network performance information, and may adjust the apportionment of a routing path set after receiving a predefined number of network performance notifications (e.g., three notifications per route) for each of the routes of the routing paths of the routing path set. As another example, the server may collect the network performance notifications and may assess the significance of the adjustments that may be required by the collected network performance notifications, and may wait to adjust the apportionment until the significance of the adjustment crosses a predefined threshold of significance. For example, if the server is notified that a previously fast route is now very slow, it may adjust the apportionment immediately; but if the network performance are not significantly changing, the server may gather the network performance notifications and may apply them together at a later time point.

Another technique for adjusting the apportionment of the data stream among the routing path sets relates to the magnitude of the adjustment with respect to the network performance notifications. As one example, the server may be configured to respond very abruptly to changes in the network performance information, e.g., by rapidly de-apportioning a routing path set having a routing path that has suddenly exhibited much lower performance. However, such rapid shifts in the apportionment may be overly responsive to ephemeral problems; e.g., an electrical spike in the networking hardware of a route may render a high-performance route unavailable for a very short time, but the route may otherwise perform smoothly. An alternative technique involves an apportionment adjustment scaling factor, which the server may apply to the apportionment adjustment determination to reduce the abruptness of the response. If an abruptly changed route continues to perform differently, then the server will steadily adjust the apportionment to account for the change; but if the abrupt change in the route is ephemeral, then the server will not have dramatically adjusted the apportionment afforded to the routing path sets including the route, and will not have to dramatically reverse the adjustments upon restoration of ordinary performance. Hence, the inclusion of an apportionment adjustment scaling factor to reduce the abruptness of the apportionment adjustment may better economize the resources of the server and may yield improved overall performance. Other variations in the frequency of adjusting the apportionment of the data stream among the routing path sets may be devised by those of ordinary skill in the art while implementing the techniques described herein.

Another potential variation of these techniques involves variably compressible data streams. Many forms of data may be compressed according to many compression algorithms that provide varying degrees of compression (i.e., varying ratios of the size of the uncompressed data stream to the size of the compressed data stream.) Often, a tradeoff exists between the tightness of the compression and the quality of the data provided therein. For example, one compression algorithm may tightly compress the data according to some more complex mathematical functions that involve more computational power to compress and decompress, whereas another compression algorithm may more loosely compress the data (yielding a larger volume compressed data stream) but that involve less complex mathematical algorithms that may be applied by lower-powered computing devices, or with fewer computing resources. As another example, audio and video may be compressed according to various "lossy" video compression algorithms, where some detail is lost in the audio and video in exchange for providing much tighter compression. The lossiness may be presented as a tradeoff between high-quality but high-data-volume audio or video, and low-quality but low-data-volume audio or video. Moreover, the tradeoff in both examples may be smoothly defined, such that a wide number of parameters may be utilized in the compression algorithm to provide a smooth gradient of options for selecting a desirable tradeoff.

These compression algorithms are often applied to the data stream by the server on-the-fly, and on a just-in-time basis (i.e., just before sending the data stream to the clients.) For such variably compressible data streams, the server may also be able to select a tradeoff between the quality of the data stream and the routing performance achieved by the delivery of the data stream, based on the capacity of the network and the size of the data stream. For example, if the server detects a comparatively high-performance network, the server may choose a lower level of compression for the data stream, resulting in a greater volume of data comprising the data stream. Conversely, if the server detects a comparatively low-performance network, the server may choose a higher level of compression for the data stream, yielding a lower-quality data stream that may be routed among the client set at an acceptable routing performance.

This tradeoff between data stream quality and network performance may be quantified, and the server may apply the quantification in order to choose an advantageous tradeoff point. The tradeoff quantification involves at least two quantitative measurements: the quality improvement in the data stream compressed with variable tightness (e.g., if the data stream is compressed a little less, how much better quality is yielded?), and the aggregate routing costs in handling data streams compressed with variable tightness (e.g., if the data stream is compressed a little less, how substantial a network slowdown will be encountered by handling the slightly larger volume of the data stream?)

The quality improvement yielded by compression of variable tightness may be quantified according to a utility function formulated with respect to the nature of the data stream and the compression algorithms applied thereto. The utility function may also be defined as limiting the parameters and bounds of the function in ways that may be advantageous. For example, the utility function may be defined as having an upper bound, wherein the marginal value of reducing the compression tightness (thereby enhancing the quality of the data stream) is kept under a maximum upper value. This upper bound may serve to prevent the utility function from advocating inordinately large increases in the reduction of the compression ratio, which, in certain conditions, may unrealistically swamp the network performance metric costs. The utility function may also have a lower bound, wherein the variably compressible data stream has a lower compression bound, wherein compressing the data stream more tightly than a predefined rate produces a data stream of unacceptably reduced quality. The range of values provided to the utility function may therefore be restricted to prevent an evaluation of the utility of compressing the data stream more tightly than the lower bound, thereby ensuring that the utility function will not advocate compression ratios producing unacceptably low-quality data streams. Other techniques in defining the parameters and bounds of the utility function may be devised by those of ordinary skill in the art while implementing the techniques described herein.

According to the quantification of the utility function and the quantification of the routing costs, a mathematical formula may be developed to express the tradeoff assessment of sending the data stream at various data rates across the routes of the routing path set. One such assessment is presented in the following mathematical formula:

$$\dot{x}_m = k_s \left( U'_s(z_s) - \frac{1}{n-1} \sum_{j \in m} (b_j^m p_j) \right)$$

wherein:
m represents the routes comprising the routing path set;
$\dot{x}_y$ represents the change in the sending rate of routing path set y;
s represents the server;
$k_x$ represents an apportionment adjustment scaling factor for the server x;
$z_x$ represents the total sending rate of server x;
$U'_x(y)$ resents the first derivative of a utility function for sending the data stream from server x at rate y;
n represents the number of clients among which the data stream is shared;
j represents a route;
$b_y^x$ represents the number of instances in which the routing path set x includes route y; and
$p_x$ represents the routing delay cost of using route x.

This formula produces the data rate change to the apportionments of the data stream among the routing path sets in view of the sending rate (i.e., the data volume) of the data stream, the relative utility of the compression (e.g., according to a utility function, such as PSNR), and the relative routing delay cost of sending the data stream across the routing path set, according to the capacity of the routes of the routing path set. An apportionment adjustment scaling factor is also included to provide a less abrupt adjustment of the apportionment in light of route performance changes. By maximizing the tradeoff in data rate with the routing costs in view of the network capabilities for each routing path set, the server may seek to maximize the choice of the compression ratio of the data stream and the apportionment of the data stream among the routing path sets.

The routing delay cost ($p_j$) may in turn be adjusted according to the following formula:

$$\dot{p}_j = \frac{1}{C_j}(y_j - C_j)^+_{p_j}$$

wherein:
$C_j$ represents the capacity of route j,
$y_j$ represents the total sending rate across route j, and is defined as:

$$y_j = \sum_{s \in S} \sum_{m \in s: j \in m} b_j^m x_m, \forall j \in J$$

wherein:
S represents the set of data stream sources,
s represents a source in the data stream source set S,
m represents a routing path set utilized by source s,
$x_m$ represents the sending rate of the routing path set m, and J represents the set of routes in the network;
and wherein
$(y_j-C_j)_{p_j}^+$ is defined as $y_j-C_j$ where $p_j>0$, and as $\max(0, y_j-C_j)$ where $p_j \leq 0$.

The routing delay cost is therefore quantified in view of the capacity of the routes and the utilization of the routes by the various servers in the network configuration.

The function provided above includes the use of the first derivative of a utility function, $U_x(y)$, which represents a utility function for sending the data stream from server x at rate y. One utility function that may be suitable in the context of audio and video data is the peak signal-to-noise ratio (PSNR) of the data stream, which measures the magnitude of the represented data in a compressed image against the magnitude of the noise introduced by the compression algorithm. The peak signal-to-noise ratio may be approximated according to the following formula:

$$U_s(z_s) = \beta_s \log(z_s)$$

and having the following first derivative:

$$U'_s(z_s) = \frac{\beta_s}{z_s}$$

wherein:
$z_x$ represents the total sending rate of server x;
$\beta_x$ represents the utility coefficient of the data stream of the server x; and $$\frac{\beta_x}{z_x}$$

represents the ratio of the utility coefficient of server x to the sending rate $z_x$, which is the first derivative of the utility $\beta_x \log z_x$, and thereby represents the marginal improvement in the utility of the data stream with respect to the sending rate $z_x$. The first derivative of this utility function may be utilized in the mathematical formula provided above. However, various other utility functions may be selected to quantify the data stream quality according to various compression algorithms.

It may be appreciated that this formula is based on the sending rates of the various servers. The problem is therefore formulated as a linear programming framework, which may be solved simultaneously for all servers; however, this solution may involve a very heavy computational burden, especially as the number of servers, clients, and routes is scaled upward. Instead, a server may estimate the network performance metric cost in view of the detected network performance of the routes, e.g., according to the relative one-way upload queuing delays detected by the clients while receiving the portions of the data stream and reported to the server, such as in FIGS. 13-16. This estimate may be plugged into the formula for $x_m$ presented above, yielding a more easily computable tradeoff between the quality of the video and the network performance metric costs for a particular sending rate. Accordingly, a server may be programmed in accordance with these formulae and techniques to choose a sending rate that is advantageous according to the current network conditions (as quantified by the network performance information, such as the relative one-way upload queuing delays, for the various routes) and the comparative utility benefits of compressing the data stream at different compression rates. It will be appreciated that those of ordinary skill in the art may be able to program servers to choose compression rates in a variety of ways while implementing the techniques described herein.

This formula may be used by a server to choose an advantageous selection among the various routing path sets in view of the network conditions, i.e., in view of the transmission rates through each client in the client set. Therefore, the formula may be utilized by a server in order to control its own operations and to improve the distribution of its data stream. However, the formula may be more broadly viewed as a model of the transmission capabilities of the network in view of all of the servers operating on the network, and all of the data streams provided by the servers to reach the various clients. Therefore, the formula may be viewed as a model of the network transmission capabilities as a whole, and may be used as a technique for improving the aggregate utility of the server set in distributing all of the data streams.

In this context, the formula may be evaluated simultaneously for all of the servers, which may yield a more cooperative sharing of network resources. As a result, the formula may indicate some selections of routing path sets that may be less advantageous for one server—i.e., that produce a routing path set having a lower data rate, and/or having a greater routing delay in reaching some clients—but that are more advantageous for other servers, and that produce an improved aggregated utility for the server set and the data stream sets as a whole. As one example, a low-capacity server may have limited upload capacity, and may have just enough capacity to disseminate its data stream to one or two clients (for redistribution among other clients.) A high-capacity server might identify a routing path set for its own data stream that routes through the low-capacity server, thereby improving the performance of the high-capacity server data stream, but at the expense of the performance of the low-capacity server data stream. Instead, the high-capacity server may choose a routing path set that does not utilize the resources of the low-capacity server. While this choice may provide slightly lower performance for the routing for the high-capacity server data stream, this choice may avoid using the upload bandwidth of the low-capacity server, thereby considerably improving the data stream performance for the low-capacity server, and by extension for the network server set as a whole. Accordingly, the formula may be evaluated for an advantageous selection of routing path sets for various servers in view of the network as a whole.

Therefore, in one variation of these techniques, the formula of one server is evaluated with consideration for the function of the other servers that are also operating on the network, i.e., the aggregated utility of the data sending rates for the data streams of all servers in the network apportioned among the available routing path sets to reach all of the clients. The formula solution produces an aggregated utility function calculation for the servers of the network. In one embodiment, the aggregated utility function may be centrally evaluated by an apportionment server (e.g., a high-performance computer capable of solving complicated mathematical formulae with an acceptable performance.) The servers may therefore send the network performance information to the apportionment server, which may calculate an aggregated utility function solution that is distributed to the servers for use in adjusting the apportionment of the data streams among the routing path sets. The aggregated utility function provided above may be suitable for this embodiment.

In another embodiment, the formula may be devised as a distributed aggregated utility function, and each server may solve the distributed aggregated utility function and adjust the apportionment of its data stream among the routing path sets according to the formula solution. One formula that may be suitable for a distributed aggregated utility function is:

$$\dot{x}_m = f_m(x_m)\left(|R_s|U'_s(z_s) - \sum_{h\in m} b_h^m G'_h(y_h) - \sum_{j\in m} b_j^m q_j(y_j)\right),$$

wherein:
m represents a routing path set utilized by the server; and
$x_y$ represents the current sending rate of the server along routing path set y;
$\dot{x}_y$ represents the change in the sending rate of routing path set y;
$f_x(y)$ represents a positive function adjusting the rate of adaptation for y;
$|R_x|U'_x(y)$ represents a derivative of a utility function for sending server x's data stream at rate y;
$z_x$ represents the total sending rate of server x;
$b_y^x$ represents the number of instances in which the routing path set x includes route y;
$G'_x(y)$ represents a penalty value for using client x to upload a portion of the data stream at rate y;
$y_j$ represents the total sending rate across route j, and is defined as:

$$y_j = \sum_{s\in S}\sum_{m\in s: j\in m} b_j^m x_m, \forall j \in J$$

wherein:
S represents the set of data stream sources;
s represents a source in the data stream source set S;
m represents a routing path set utilized by source s; and
J represents the set of routes in the network; and
$q_j(w)$ represents a queuing delay cost associated with exceeding the capacity constraint of route j, and is defined as:

$$q_j(w) = \frac{(w-C_j)^+}{w}$$

wherein:
$C_j$ represents the capacity of route j, and
$(w-C_j)^+$ is defined as $w-C_j$ where $p_j>0$, and as max(0, $w-C_j$) where $p_j\leq 0$.

This distributed aggregated utility function permits the adjustment of the rate of change of the apportionment of the data stream among various routing path sets. This distributed aggregated utility function also permits the specification of a penalty factor, which represents an assigned cost in using a particular client to redistribute the data stream on behalf of the server. The penalty factors may be set and adjusted (automatically or manually) to reach an advantageous distribution of the routing path sets among the servers. By solving the distributed aggregated utility function and using the solution to adjust the apportionment of the data stream among the routing path sets, a server may therefore achieve a routing path set apportionment that is advantageous for distributing the data stream of the server, in view of the utilization of the same network resources by at least one other server in the network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of sending a data stream from a server comprising a processor to a client set over a computer network, the method comprising:
    executing on the processor instructions configured to:
        prepare at least two routing path sets covering the client set, respective routing path sets comprising at least one routing path comprising at least one route between the server and a client through at least zero other clients; and
        send the data stream to the client set by:
            sending portions of the data stream to the clients via the routing path sets;
            detecting at least one network performance indicator of the performance of the computer network; and
            adjusting the apportionment of the data stream among the routing path sets according to the at least one network performance indicator.

2. The method of claim 1, at least one client detecting the network performance indicator while receiving portions of the data stream from the server and other clients, and sending the detected network performance indicators of the routes to the server.

3. The method of claim 2, the server and the clients adding a timestamp to the data stream before sending the data stream to a receiving client, and the receiving client detecting the network performance indicator according to the timestamp.

4. The method of claim 3, the network performance indicator comprising an upload queuing delay detected according to a relative one-way upload queuing delay according to the timestamp.

5. The method of claim 1, at least one client comprising a second server sending a second data stream to the server and the other clients, and the method comprising:
    receiving the second data stream from the second server, and
    sending at least one network performance descriptor with the second data stream to the next client in the routing path of the portion of the second data stream; and the adjusting comprising: adjusting the apportionment of the data stream among the routing path sets according to at least one network performance descriptor received with the second data stream.

6. The method of claim 1, at least one client comprising an auxiliary server of the data stream.

7. The method of claim 1, the data stream comprising a variably compressible data stream, and the apportionment adjusted according to a utility function.

8. A method of sending a first data stream from a first server having a processor to a client set over a computer network having at least one other server sending at least one other data stream to the client set and the first server, the method comprising:
    executing on the processor instructions configured to:
        prepare at least two routing path sets covering the client set, respective routing path sets comprising at least one routing path comprising at least one route between the first server and a client through at least zero other clients; and
        send the data stream to the client set by:
            sending portions of the data stream to the clients via the routing path sets;
            detecting at least one network performance indicator of the performance of the computer network; and
            adjusting the apportionment of the data stream among the routing path sets according to an aggregated utility function based on the at least one network performance indicator, and according to the aggregated utility for the first server and the at least one other server.

9. The method of claim 8, the network performance indicator comprising a routing delay indicator for at least one route of the computer network.

10. The method of claim 9, the adjusting comprising:
    sending the at least one network performance indicator to an apportionment server configured to solve the aggregated utility function for the first server and the other servers;
    receiving from the apportionment server an aggregated utility function solution; and
    adjusting the apportionment of the data stream among the routing path sets based on the aggregated utility function solution.

11. The method of claim 8, at least one client detecting the network performance indicator while receiving portions of the data stream from the server and other clients, and sending the detected network performance indicators of the routes to the server.

12. The method of claim 11, the server and the clients adding a timestamp to the data stream before sending the data stream to a receiving client, and the receiving client detecting the network performance indicator according to the timestamp.

13. The method of claim 12, the network performance indicator comprising an upload queuing delay detected according to a relative one-way upload queuing delay according to the timestamp.

14. The method of claim 8, at least one of the other servers comprising a second server sending a second data stream to the server and the other clients, and the method comprising:
    receiving the second data stream from the second server, and
    sending at least one network performance descriptor with the second data stream to the next client in the routing path of the portion of the second data stream; and the adjusting comprising: adjusting the apportionment of the data stream among the routing path sets according to at least one network performance descriptor received with the second data stream.

15. The method of claim 8, at least one client comprising an auxiliary server of the data stream.

16. The method of claim 8, the data stream comprising a variably compressible data stream, and the apportionment adjusted according to a utility function.

17. The method of claim 8, the aggregated utility function comprising a distributed aggregated utility function representing the aggregated utility of the first server and the other servers in view of the at least one network performance indicator, and the adjusting comprising:
    solving the distributed aggregated utility function at the first server to produce a distributed aggregated utility function solution; and adjusting the apportionment of the data stream among the routing path sets according to the distributed aggregated utility function solution.

18. A computer-readable storage medium comprising instructions that, when executed by a processor of a server, cause the server to send a data stream to a client set by:

generating at least two routing path sets covering the client set, respective routing path sets comprising at least one routing path comprising at least one route between the server and a client through at least zero other client;

sending portions of the data stream to the clients via the routing path sets;

detecting the performance of the computer network while sending the portion of the data stream; and adjusting the apportionment of the data stream among the routing path sets by the data stream transmission component according to the performance of the computer network detected by the network performance detection component.

19. The computer-readable storage medium of claim 18, the instructions further causing the server to receive a second data stream from a second server over a computer network by:

receiving the second data stream from the second server; and sending the second data stream to the next client in the routing path of the second stream.

20. The method of claim 1, adjusting the apportionment of the data stream among the routing path sets comprising:

reducing the apportionment of the data stream via a first routing path set having a lower network performance indicator, and proportionally increasing the apportionment of the data stream via at least one other routing path set.

* * * * *